Oct. 4, 1932.  J. B. McMULLEN  1,880,208
VEHICLE BODY
Filed April 6, 1929   4 Sheets-Sheet 1
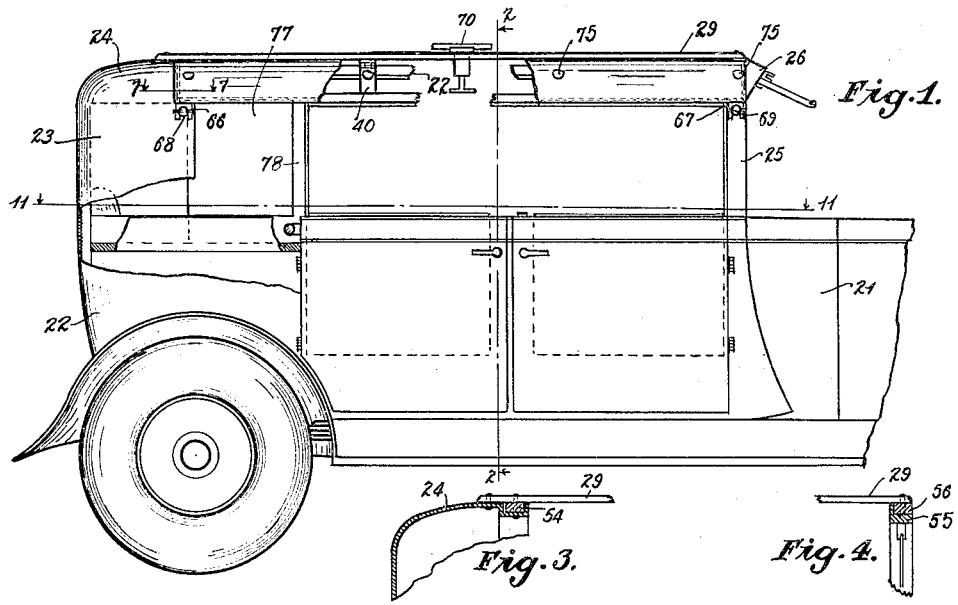
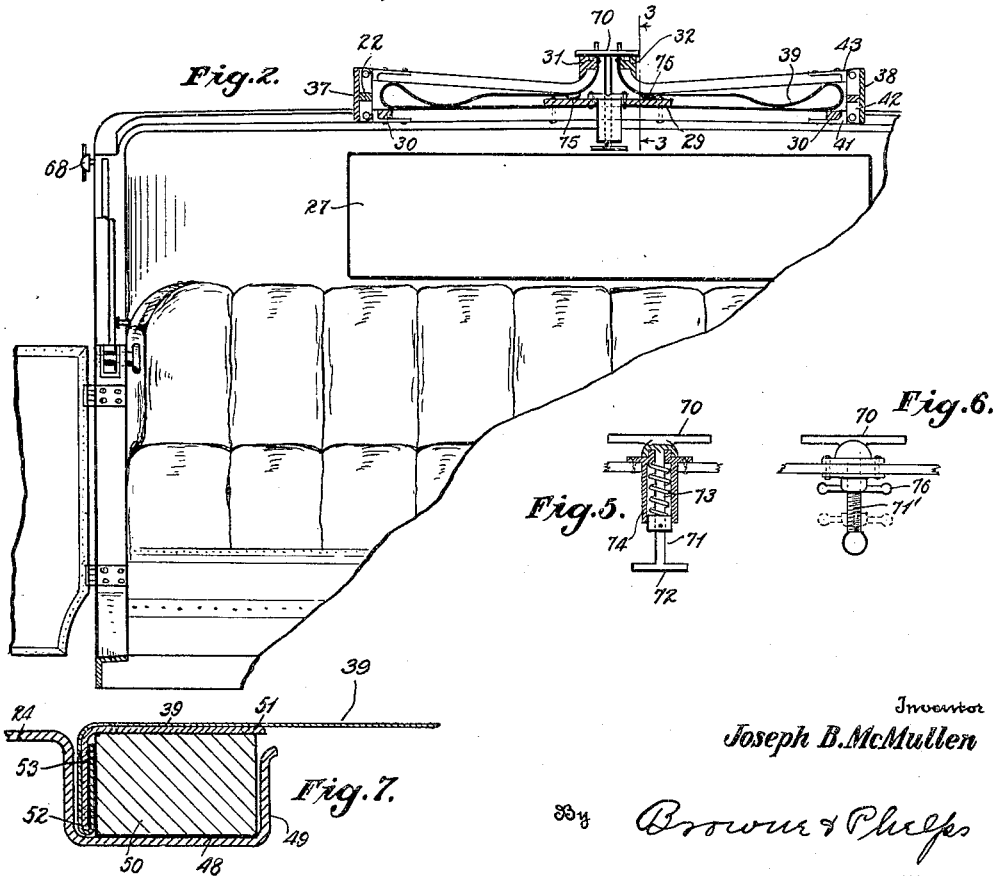
Inventor
Joseph B. McMullen
By Brown & Phelps
Attorneys Oct. 4, 1932.   J. B. McMULLEN   1,880,208
VEHICLE BODY
Filed April 6, 1929   4 Sheets-Sheet 2

Inventor
Joseph B. McMullen
By Brown & Phelps
Attorneys

Oct. 4, 1932.  J. B. McMULLEN  1,880,208
VEHICLE BODY
Filed April 6, 1929   4 Sheets-Sheet 3
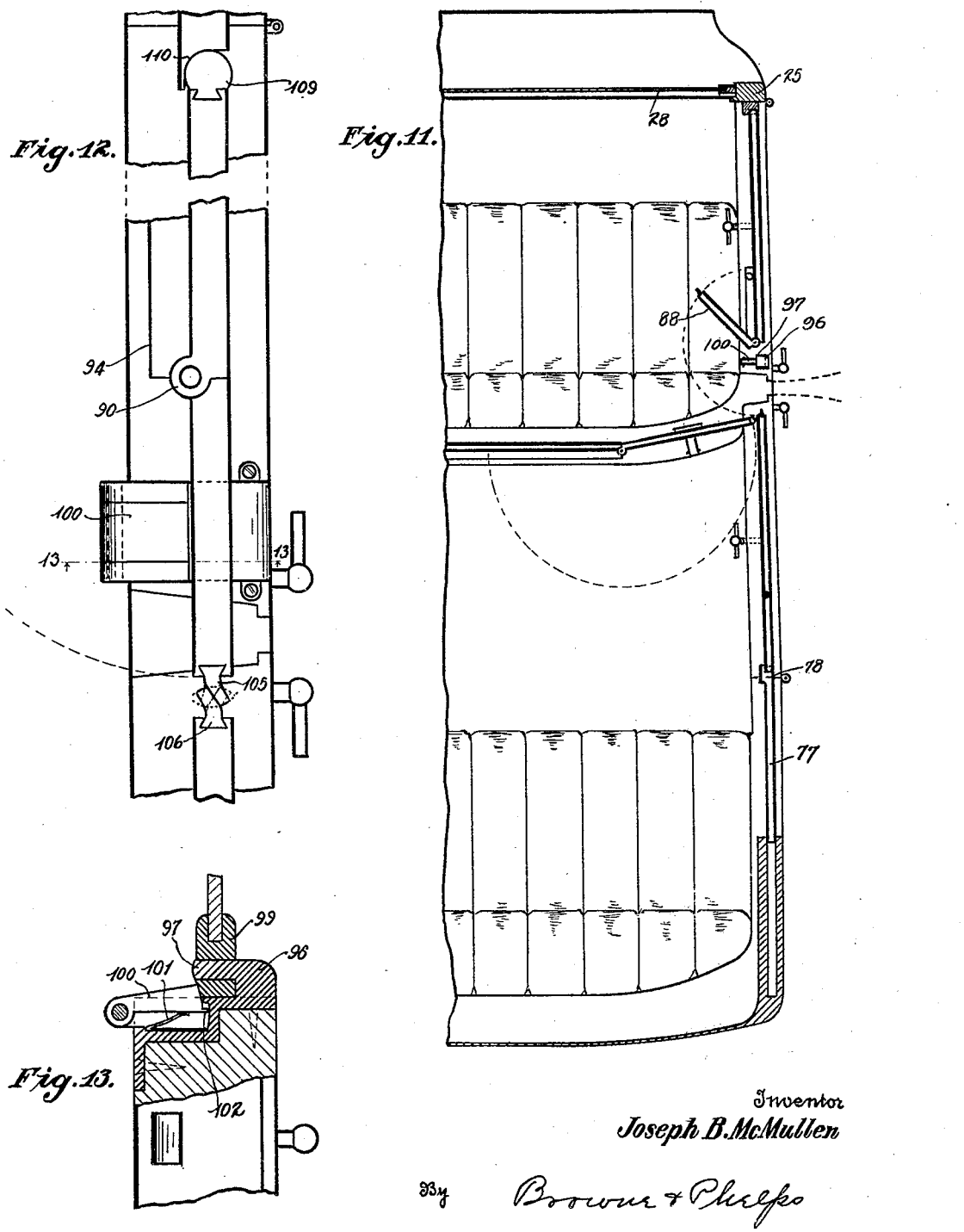
Inventor
Joseph B. McMullen
By Brown & Phelps
Attorneys

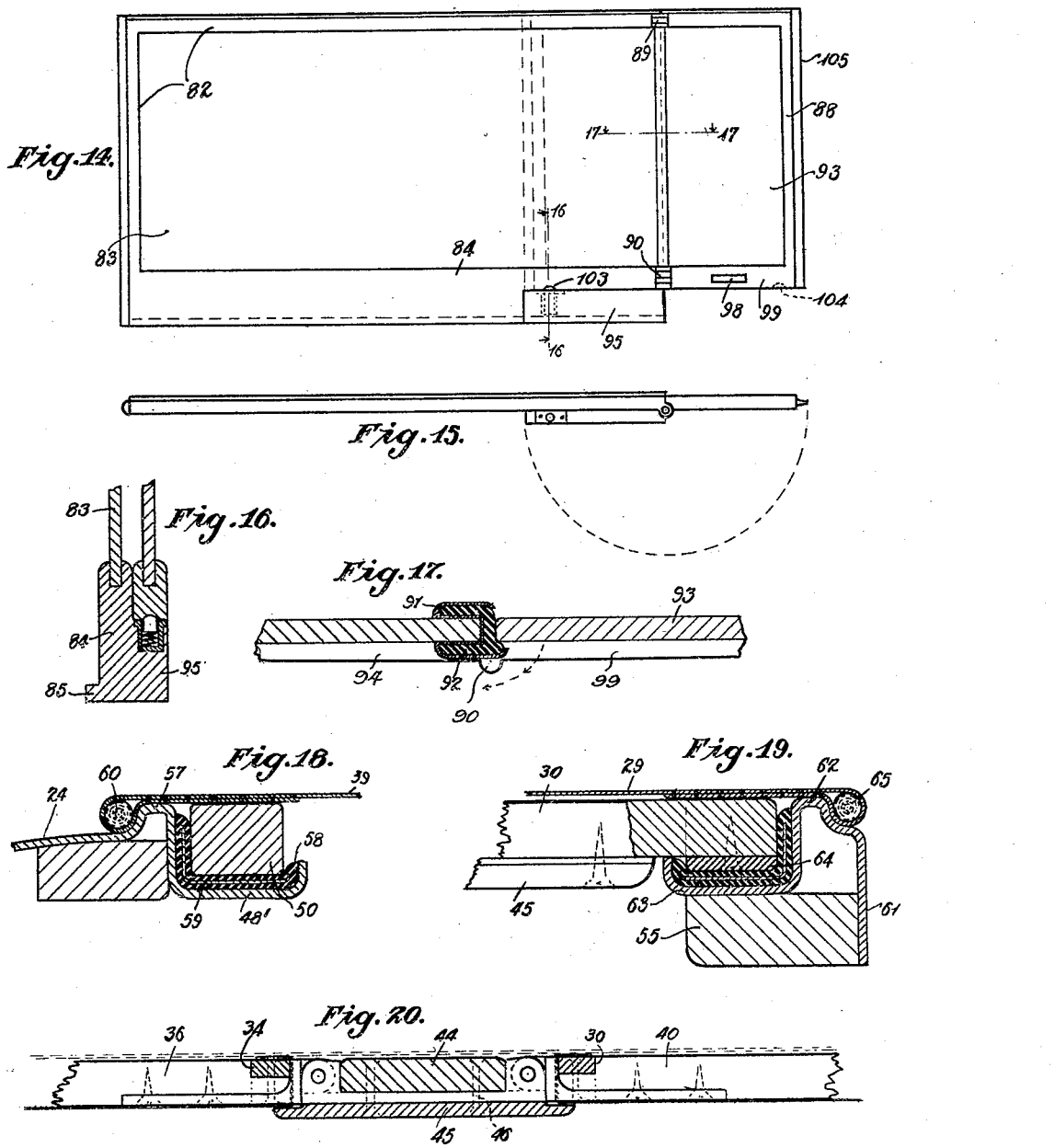

Patented Oct. 4, 1932

1,880,208

UNITED STATES PATENT OFFICE

JOSEPH B. McMULLEN, OF WASHINGTON, DISTRICT OF COLUMBIA

VEHICLE BODY

Application filed April 6, 1929. Serial No. 353,236.

The invention relates to vehicle bodies and has as an object the provision of a body combining the advantages of an open car and a closed car.

It is an object of the invention to provide a body having a standing top, a portion of which is hinged so as to fold upon the fixed portion thereof.

It is a further object of the invention to provide a body having doors which give a closed car when extended and which give an open car without standing columns when collapsed.

It is a further object of the invention to provide a body having folding portions which can be very quickly manipulated to provide a complete closure.

It is a further object of the invention to provide a body having a standing portion and a folding portion which will be weather tight in its engagement with the standing portion when closed.

It is a further object of the invention to improve the details for carying out the above named objects.

Further objects of the invention will appear from the following description when read in connection with the accompanying drawings showing an illustrative embodiment of the invention and wherein:—

Fig. 1 is a side elevation partly broken away showing the body with the glass of the doors lowered into the doors;

Fig. 2 is a vertical section on line 2—2 of Fig. 1 partly broken away and showing the movable portions of the top folded;

Fig. 3 is a detail vertical section on line 3—3 of Fig. 2;

Fig. 4 is a like section on line 4—4 of Fig. 9;

Fig. 5 is a detail vertical section upon an enlarged scale on line 5—5 of Fig. 9;

Fig. 6 is a side elevation of a modified form of the means shown in Fig. 5 for holding the top in its folded position;

Fig. 7 is a detail vertical section upon an enlarged scale on line 7—7 of Fig. 1;

Fig. 11 is a detail horizontal section on line 11—11 of Fig. 1 upon an enlarged scale;

Fig. 12 is a detail plan view of the right front door of the body showing the joint between the glass of the front and the rear door;

Fig. 13 is a detail vertical section on line 13—13 of Fig. 12;

Fig. 14 is a side elevation viewed from the inside of the right front door;

Fig. 15 is a plan view thereof;

Fig. 16 is a detail vertical section on line 16—16 of Fig. 14 upon an enlarged scale;

Fig. 17 is a detail horizontal section on line 17—17 of Fig. 14 upon an enlarged scale showing the joint between the swinging and main portions of the front door;

Fig. 18 is a section corresponding to Fig. 7 showing a modified form of joint between the folding and standing portions of the body at the rear end of the folding portion;

Fig. 19 is a view corresponding to Fig. 4 upon an enlarged scale constructed according to the modification of Fig. 18; and Fig. 20 is a detail section upon the line upon which Fig. 9 is taken drawn to an enlarged scale showing one of the hinges upon which the folding portion of the top swings.

Figure 8:
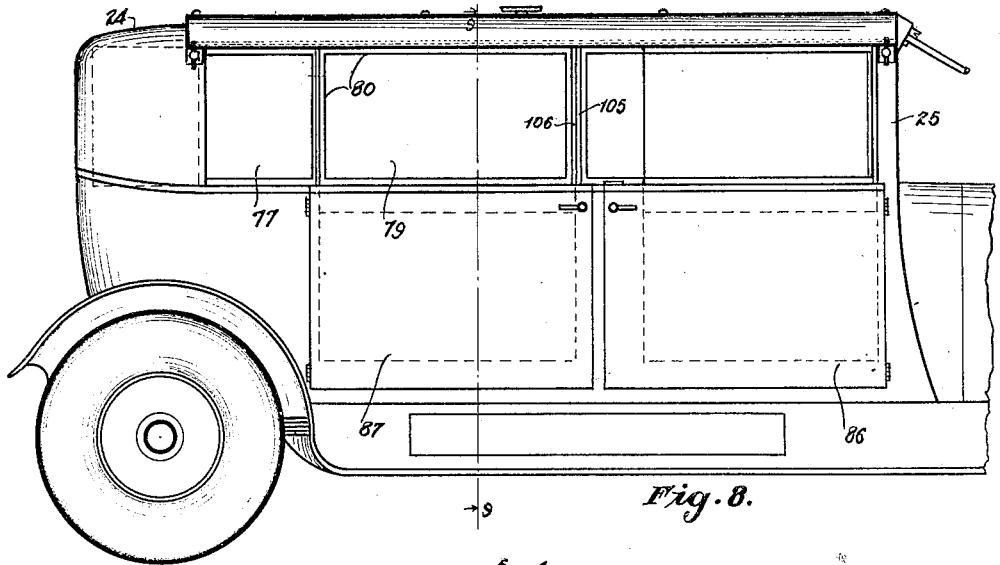
Fig. 8 is a side elevation of the body with the parts fully closed.

As shown the device comprises a standing portion comprising a cowl 21, a rear body portion 22 having a standing portion 23 extending into a standing roof portion 24 over the rear seat of the vehicle and also having a wind shield frame 25 which is also a part of the standing portion of the body and which may be equipped with a visor 26 if desired. The rear of the standing portion 23 is shown as provided with a window 27 according to the usual practice and the windshield 28 carried by the standing frame 25 may be made according to the usual or any desired practice.

To provide a standing portion of the top of the body, there is shown a central rib 29 and ribs 30 parallel therewith which have permanent engagement with the windshield frame 25 and with the standing portion 24 of the roof.

The folding portion of the roof is shown as provided with side frame members 31, 32, and longitudinal ribs 33, 34, the ribs 32, 33 being shown as connected by means of bows 35 and the ribs 31, 34 being shown as connected by means of bows 36, the ribs 33, 34 being connected to a stationary member of the top by double throw hinges 37, 38.

Figure 9:
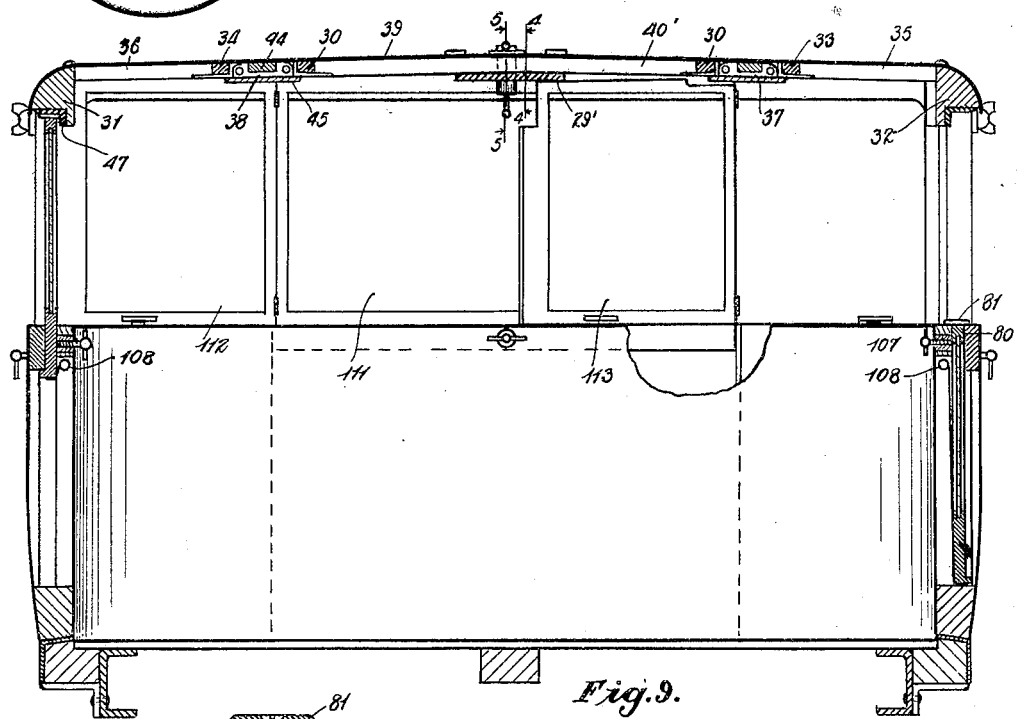
Fig. 9 is a transverse section on line 9—9 of Fig. 8 upon an enlarged scale.

The top covering of flexible material 39 is shown extending over rib 31 across the bows 36, 40, 35, and being secured to the ribs 31, 32. The modified form of Fig. 9 shows a rib 29' running under the bows 40', which bows extend between ribs 30 to provide cross members of the standing portion of the roof.

To prevent the formation of a sharp bend in the top material 39 when the parts are folded, double throw hinges are provided as at 37, 38 having each a fixed portion 41, a movable portion 42 pivoted thereto and a second movable portion 43 pivoted upon portion 42. The hinge of Fig. 9 differs in structure but not in mode of operation from that shown in Fig. 2. In Fig. 9 a longitudinal rib 44 is shown as passing through a recess in each of the hinges and a lower rib 45 is shown interiorly of the top and as more clearly shown in detail in Fig. 20, the rib 44 and the rib 45 being secured together between the hinges as by means of fastenings 46 shown in dotted lines in Fig. 20.

The lower surfaces of ribs 31, 32, are shown as rabbeted for coaction with the glass of the doors and as provided with a sealing and buffer strip 47 preferably of rubber or the like.

In the form of the invention shown in Figs. 3, 4, and 7, the standing portion 24 of the roof is formed with a channel 48 having an upturned edge 49 and the rear bow 50 of the folding portion of the top is adapted to lie in the channel 48 when the top is closed. The top material 39 is shown in Fig. 7 as turned about a corner of the bow 50, a metal plate 51 being desirably carried down around the bow 50 and the top material in turn carried up about the edge 52 of the plate 51 as shown at 53. The rear bow 54 of the standing portion of the top as shown in Fig. 3 is permanently secured in the channel 48 and the exterior rib 29 of the standing portion of the top is shown as secured to the rib 54 and to the standing portion 24 of the roof.

In the form of Figs. 1 to 7 inclusive, the windshield frame is formed with a rabbeted portion 55 and a front bow 56 of the standing portion of the top is secured rigidly thereto, the movable bow of the front portion of the top fitting into the rabbet in the same manner as shown for the rear portion in Fig. 7.

A modified form of joint between the folding portion and the rear portion, at the rear end of the folding portion, is shown in Fig. 18 wherein the standing portion 24 is shown as having a ridge 57 and a channel 48', the latter channel being lined with cushioning material, as rubber, shown at 58, which material may desirably have a stiffening plate of metal, as shown at 59, imbedded therein. In this form of the device the top material 39 is shown as having a bead edge 60 which may be formed of wire cable, rope or the like, which is readily flexible and may bend with the material when folded into the form shown in Fig. 2, the top material being rigidly secured to the rear bow 50. In this form of the device, the wind shield frame 55 is shown as covered with metal at 61 having a ridge 62 and a channel 63 also lined with cushioning material into which the swinging bow 64 of the top may seat, a portion of the longitudinal rib 30 being shown in this figure notched into the transverse bow 64 at its front end. In this fiure, there is also shown the front edge of cover 29 provided with a bead 65 similar to the bead 60 at the rear edge of the same.

To hold the folding portion of the top in its closed position, there are shown yokes 66, 67, having slotted ends falling behind wing nuts 68, 69, which may be screwed down against the yokes when the device is closed. To prevent movement of the folding portions of the top in the open position of Fig. 2, the device of Figs. 5 or 6 is provided wherein is shown a member having a T head 70 carried by a shank 71 terminating at its lower portion in a handle 72 and pressed to the position shown in Fig. 5 by means of a spring 73 housed in a cylindrical casing 74 extending through the rib 29. The normal position of this device when the top is closed is that shown in Fig. 1. When the side portions of the top are folded to the position of Fig. 2, the handle 72 is grasped and the shank 71 positioned upwardly to a point about the ribs 31, 32, when the handle is turned through 90 bringing the T head 70 into overlapping relation with the ribs 31, 32 after which the spring 73 will exert pressure upon the folded top to prevent movement thereof.

As shown, buffer buttons 75 are provided upon the folding portions of the top to contact with the rib 29 whereby to prevent abrasion of the top material. In the modified form of Fig. 6, the T head 70 is continued into a screw-threaded shank 71' whereby the head 70 may be drawn down into snug engagement with the ribs 31, 32, by means of revolution of a wing nut 76 which may be turned to the dotted line position of Fig. 6 prior to the clamping of the folding members.

To provide closures for the side of the body, there is shown a rear window 77 which is adapted to slide rearwardly into the dotted line position of Figs. 1 and 8, into a pocket in the standing portion of the body, a frame 78 being desirably provided for the glass of this window.

Figure 10:
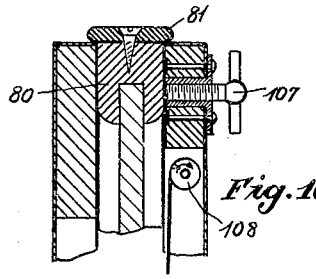
Fig. 10 is a detail section through one of the doors with the glass lowered thereinto taken on line 9—9 of Fig. 8.

The rear door is shown as provided with a vertically sliding sash having glass at 79 and a frame 80 which may slide into the rear door in the manner usual with sedan bodies. Desirably a cap member 81, as shown in Fig. 10 is provided upon the frame 80 of the sash to provide a neat finish when the glass is down.

A front door which may coact with the sash of the rear door without a standing pillar therebetween is shown in elevation in Fig. 14, and as comprising a frame 82 about and at the vertical edges of the glass 83, and a thickened frame member 84 at the bottom of the glass 83. The bottom frame member 84 is shown as formed with a shoulder 85 to limit the upward movement of the frame in the pocket of the door. To extend across the space between the front door 86 and the rear door 87, the front sash is shown as provided with a hinged portion 88 hinged at 89, 90 to the upper portion of the frame 82 and to the lower frame member 84 thereof. The rear edge of glass 83 is shown in Fig. 17 as formed with a frame 91 preferably of metal having a rubber channel filling 92 exposed at the portion coacting with the swinging glass 93 so as to provide a glass-to-rubber contact, this portion of glass 93 being adapted to swing in the direction of the arrow in said figure.

To enable the swinging portion of the glass to fold into the pocket of the front door, the pocket is shown in Fig. 12 as formed with a recess at 94, the opening of which recess is filled when the glass is up by the outstanding portion 95 carried by the lower member 84 of the frame for the glass 83.

To hold the swinging frame 88 in its extended position when the glass is up and is to swing with the door 86, there is shown a hook-shaped portion 96 rigidly carried by the door having its extension 97 coacting with a slot 98 in the lower member 99 of the frame of the glass 93. To hold the glass in the extended position shown in Fig. 14, a latch 100 is shown carried by the upper edge of the door adjacent its swinging edge and spring pressed upwardly by means of a compression spring 101 coacting with the portion of frame member 99 below the slot 98, the coacting portion between the latch 100 and the frame 99 being shown in Fig. 13 as beveled to provide a cam action to firmly seat the frame member 99 against the hook member 96 and to take care of wear between the parts.

The upward movement of latch 100 is adapted to be limited by means of a projection 102 carried by the latch member 100. When the swinging portion 88 of the sash is to be folded upon the main portion thereof, the latch 100 may be depressed and the parts swung to folded position shown in dotted lines in Fig. 14 where they will be retained by means of a snap catch 103 carried on the shoulder 95 coacting with a recess 104 in the bottom edge of the frame member 99.

It will be seen, as particularly shown in Fig. 11, that folding of the swinging portion of the glass of the front door without the glass being dropped into the door will provide an opening through which the driver may extend his arm for signalling, the body being otherwise completely closed.

To provide a coaction between the front and rear doors to close the joint therebetween, the structure of Fig. 12 is provided. In this figure are shown flexible members 105, 106 which are duplicates of each other and which are carried by the front edge of the frame 80 of the glass in the rear door and by the frame 88 of the swinging portion of the glass of the front door. With the parts shown in the position of Fig. 12, if the rear door be opened, the members 105, 106 will yield and when this door is again closed, the parts will be reversed in relation as in the dotted lines shown in this figure. When the doors are opened, members 105, 106 will occupy a position extending centrally from the frame members so as to be symmetrical about a vertical plane through the center of the member. The glass in the doors may be retained in erected or collapsed position in any desirable manner, one form of structure for this purpose being shown in Fig. 10, in the form of a screwthreaded member 107 which may be turned against the upper or lower frame member of glass and will hold the glass in the position desired without rattling.

In Fig. 9 is indicated a spring roller 108 which may be utilized to balance the weight of the glass.

A joint for the hinged edge of the glass of the front door is indicated in Fig. 12 in the form of a cushioning strip 109 coacting with a rabbet 110 carried by the door frame and it will be understood that the same form of joint may be provided between the frame 80 of the rear door and the frame 78 of the sliding glass 77.

A limousine enclosure for the space between the front and rear seats is shown in Figs. 9 and 11 in the form of a standing glass portion 111 and folding wing members 112 and 113, that to the right in Fig. 9 being shown as folded upon the portion 111. When the portions 112, 113 are both folded, the standing portion 111 may be dropped with the folding portion into the pocket indicated in dotted lines in Fig. 9.

It will be seen that the device may be used in a variety of positions; the folding portions of the top may be swung to the position of Fig. 2 leaving the glass in the doors up, or the glass of the doors may be lowered leaving the top extended or the whole may be thrown open making a close approach to an entirely open car. The portion 88 of the glass of the front door may be opened in the manner shown in Fig. 11 with the rest of the car entirely closed while driving in traffic whereby to enable the driver to signal as is desirable without the entrance of the elements.

Minor changes may be made in the physical embodiment of the invention within the scope of the appended claims without departing from the spirit thereof.

I claim:

1. A passenger vehicle body comprising, in combination, front and rear standing portions, each having a channel adjacent its inner edge and a raised portion adjacent said channel, a longitudinal stationary portion permanently secured to said front and rear portions, a longitudinally pivoted portion hinged to said stationary portion and having members seating in said channels when in unfolded position, top material covering said stationary and longitudinal portions in common adapted to engage said raised portions and a beaded edge adapted to overlap said raised portions to form a weather-tight joint therewith.

2. A passenger vehicle body top comprising, in combination, front and rear standing portions each having a ridge upon its upper portion adjacent its inner edge, a central longitudinal portion rigidly secured at its ends to said standing portions, a folding portion hinged to an edge of said longitudinal portion and comprising a longitudinal bar at its free edge and transverse bars each secured at its outer end to said longitudinal bar, said transverse bars, when the folding portion is extended, standing substantially flush with said ridges, a covering secured to said longitudinal portion and to said longitudinal bar only, said covering projecting beyond the outermost transverse bars to contact with the tops of said ridges, beads carried by the projecting ends of said covering contacting with said standing portion beyond said ridges, and releasable means to secure said longitudinal bar to said standing portions with said folding portion closed.

3. A vehicle body comprising, in combination, front and rear standing portions, a longitudinal roof member permanently secured at its ends to said portions, a longitudinally extending movable roof panel, double throw hinge means connected to said panel and to said member at a plurality of points, rigid means extending along the space between the connected edges of said panel and member and secured to said hinge means to provide rigidity of the hinge means between said points and a covering of flexible top material extending over said member, said hinge means and said panel.

4. A vehicle body comprising, in combination, front and rear standing portions, a longitudinal roof portion permanently connected at its ends to said standing portions, a longitudinally extending movable roof panel, a plurality of double throw hinges each comprising a central member and end members one of the latter of each hinge secured to said roof portion and the other thereof secured to said panel respectively, and a longitudinally extending rib secured to the central members of said hinges to rigidly connect said hinges and to substantially close the space between said portion and said panel.

JOSEPH B. McMULLEN.